US008921286B2

(12) United States Patent  
Malshe

(10) Patent No.: US 8,921,286 B2  
(45) Date of Patent: *Dec. 30, 2014

(54) TEXTURED SURFACES TO ENHANCE NANO-LUBRICATION

(71) Applicant: NanoMech, Inc., Springdale, AK (US)

(72) Inventor: Ajay P. Malshe, Springdale, AK (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/917,321

(22) Filed: Jun. 13, 2013

(65) Prior Publication Data

US 2014/0005083 A1 Jan. 2, 2014

Related U.S. Application Data

(63) Continuation of application No. 13/540,256, filed on Jul. 2, 2012, now Pat. No. 8,486,870.

(51) Int. Cl.  
B05D 3/00 (2006.01)  
B32B 3/10 (2006.01)  
B32B 33/00 (2006.01)  
F16C 33/02 (2006.01)  
C10M 171/00 (2006.01)  
B82Y 30/00 (2011.01)

(52) U.S. Cl.  
CPC . *F16C 33/02* (2013.01); *B32B 3/10* (2013.01); *C10M 171/00* (2013.01); *B82Y 30/00* (2013.01); *C10N 2220/082* (2013.01); *C10N 2250/141* (2013.01); *Y10S 428/9088* (2013.01); *Y10S 977/773* (2013.01); *Y10S 977/903* (2013.01)  
USPC ........... 508/100; 508/103; 508/108; 427/307; 427/555; 428/137; 428/687; 428/908.8; 977/773; 977/903

(58) Field of Classification Search  
USPC .......................................... 508/100, 103, 108  
See application file for complete search history.

(56) References Cited

U.S. PATENT DOCUMENTS 4,105,571 A 8/1978 Shaub et al.  
4,168,241 A 9/1979 Kozima et al.  
(Continued)

FOREIGN PATENT DOCUMENTS

CN 1080648 1/1994  
JP 10130678 A 5/1998  
(Continued)

OTHER PUBLICATIONS

Bakunin, V.N. et al., "Synthesis and application of inorganic nanoparticles as lubricant components—a review", J. Nanoparticle Res. (2004) 6:273-284.

(Continued)

*Primary Examiner* — Ellen McAvoy  
(74) *Attorney, Agent, or Firm* — Akerman LLP; Stephen C. Glazier

(57) ABSTRACT

Embodiments of the present invention may provide textured surfaces to be lubricated, the texturing to enhance the effectiveness of the intended nano-lubrication. The texturing may make asperities and depressions in the surface to be lubricated. This texturing may be executed, for example, by chemical etching, laser etching, or other techniques. This texturing may create locations in the lubricated surface to hold or anchor the intended nano-lubricants, to facilitate the creation of a tribo-film on the surface when the lubricated surface is used under pressure, and resulting in delivery of multiple chemistries from the nano-lubricant.

93 Claims, 6 Drawing Sheets

(56) References Cited

U.S. PATENT DOCUMENTS

| | | |
|---|---|---|
| 4,223,958 A | 9/1980 | Gray |
| 4,334,928 A | 6/1982 | Hara et al. |
| 4,715,972 A | 12/1987 | Pacholke |
| 4,745,010 A | 5/1988 | Sarin et al. |
| 4,816,334 A | 3/1989 | Yokoyama et al. |
| 4,877,677 A | 10/1989 | Hirochi et al. |
| 5,129,918 A | 7/1992 | Chattopadhay |
| 5,273,790 A | 12/1993 | Herb et al. |
| 5,286,565 A | 2/1994 | Holzl et al. |
| 5,328,875 A | 7/1994 | Ueda et al. |
| 5,330,854 A | 7/1994 | Singh et al. |
| 5,352,501 A | 10/1994 | Miyamoto et al. |
| 5,363,821 A | 11/1994 | Rao et al. |
| 5,389,118 A | 2/1995 | Hinterman et al. |
| 5,391,422 A | 2/1995 | Omori et al. |
| 5,407,464 A | 4/1995 | Kaliski |
| 5,441,762 A | 8/1995 | Gray et al. |
| 5,466,642 A | 11/1995 | Tajima et al. |
| 5,478,622 A | 12/1995 | Nakamura et al. |
| 5,500,331 A | 3/1996 | Czekai et al. |
| 5,503,913 A | 4/1996 | Konig et al. |
| 5,523,006 A | 6/1996 | Strumban |
| 5,534,808 A | 7/1996 | Takaki et al. |
| 5,536,577 A | 7/1996 | Murayama et al. |
| 5,614,140 A | 3/1997 | Pinneo |
| 5,671,532 A | 9/1997 | Rao et al. |
| 5,677,060 A | 10/1997 | Terentieva et al. |
| 5,704,556 A | 1/1998 | McLaughlin |
| 5,766,783 A | 6/1998 | Utsumi et al. |
| 5,800,866 A | 9/1998 | Myers et al. |
| 5,830,577 A | 11/1998 | Murayama et al. |
| 5,830,813 A | 11/1998 | Yao et al. |
| 5,834,689 A | 11/1998 | Cook |
| 5,882,777 A | 3/1999 | Kukino et al. |
| 5,889,219 A | 3/1999 | Moriguchi et al. |
| 5,897,751 A | 4/1999 | Makowiecki et al. |
| 5,902,671 A | 5/1999 | Kutscher |
| 5,928,771 A | 7/1999 | DeWald, Jr. et al. |
| 5,945,166 A | 8/1999 | Singh et al. |
| 6,146,645 A | 11/2000 | Deckers et al. |
| 6,183,762 B1 | 2/2001 | Deckers et al. |
| 6,196,910 B1 | 3/2001 | Johnson et al. |
| 6,210,742 B1 | 4/2001 | Deckers et al. |
| 6,217,843 B1 | 4/2001 | Homyonfer et al. |
| 6,258,139 B1 | 7/2001 | Jensen |
| 6,258,237 B1 | 7/2001 | Gal-Or et al. |
| 6,370,762 B1 | 4/2002 | Li et al. |
| 6,372,012 B1 | 4/2002 | Majagi et al. |
| 6,383,404 B1 | 5/2002 | Sakai et al. |
| 6,395,634 B1 | 5/2002 | Miyamoto |
| 6,410,086 B1 | 6/2002 | Brandon et al. |
| 6,484,826 B1 | 11/2002 | Anderson et al. |
| 6,540,800 B2 | 4/2003 | Sherman et al. |
| 6,544,599 B1 | 4/2003 | Brown et al. |
| 6,548,139 B2 | 4/2003 | Sakai et al. |
| 6,548,264 B1 | 4/2003 | Tan et al. |
| 6,607,782 B1 | 8/2003 | Malshe et al. |
| 6,652,967 B2 | 11/2003 | Yadav et al. |
| 6,709,622 B2 | 3/2004 | Billiet et al. |
| 6,710,020 B2 | 3/2004 | Tenne et al. |
| 6,878,676 B1 | 4/2005 | Migdal et al. |
| 6,895,855 B2 | 5/2005 | Doll |
| 6,933,049 B2 | 8/2005 | Wan et al. |
| 6,933,263 B2 | 8/2005 | Manka et al. |
| 6,945,699 B2 | 9/2005 | Tibbits |
| 6,951,583 B2 | 10/2005 | Clere et al. |
| 6,962,895 B2 | 11/2005 | Scharf et al. |
| 6,962,946 B2 | 11/2005 | Brady et al. |
| 6,976,647 B2 | 12/2005 | Reed et al. |
| 7,018,606 B2 | 3/2006 | Tenne et al. |
| 7,018,958 B2 | 3/2006 | Arrowsmith et al. |
| 7,022,653 B2 | 4/2006 | Hartley et al. |
| 7,244,498 B2 | 7/2007 | Cook et al. |
| 7,335,245 B2 | 2/2008 | He et al. |
| 7,371,474 B1 | 5/2008 | Liu et al. |
| 7,372,615 B2 | 5/2008 | Chen et al. |
| 7,374,473 B2 | 5/2008 | Kumasaka et al. |
| 7,375,060 B2 | 5/2008 | Kuzmin et al. |
| 7,387,813 B2 | 6/2008 | Kumar et al. |
| 7,410,697 B2 | 8/2008 | Schneider et al. |
| 7,419,941 B2 | 9/2008 | Waynick |
| 7,430,359 B2 | 9/2008 | Chen et al. |
| 7,438,976 B2 | 10/2008 | He et al. |
| 7,449,432 B2 | 11/2008 | Lockwood et al. |
| 7,458,384 B1 | 12/2008 | Seal et al. |
| 7,463,404 B2 | 12/2008 | Chen et al. |
| 7,470,650 B2 | 12/2008 | Zhang et al. |
| 7,471,439 B2 | 12/2008 | Chen et al. |
| 7,494,907 B2 | 2/2009 | Brown et al. |
| 7,510,760 B2 | 3/2009 | Malshe et al. |
| 7,524,481 B2 | 4/2009 | Tenne et al. |
| 7,549,938 B2 | 6/2009 | Leighton et al. |
| 7,556,743 B2 | 7/2009 | Furman et al. |
| 7,571,774 B2 | 8/2009 | Shuster et al. |
| 7,580,174 B2 | 8/2009 | Chen et al. |
| 7,594,962 B2 | 9/2009 | Bujard et al. |
| 7,597,950 B1 | 10/2009 | Stellacci et al. |
| 7,614,270 B2 | 11/2009 | Luckey, Jr. et al. |
| 7,616,370 B2 | 11/2009 | Chen et al. |
| 7,632,788 B2 * | 12/2009 | Jao et al. ......... 508/410 |
| 7,641,886 B2 | 1/2010 | Tenne et al. |
| 7,687,112 B2 | 3/2010 | Buehler et al. |
| 7,704,125 B2 | 4/2010 | Roy et al. |
| 7,723,812 B2 | 5/2010 | Chen et al. |
| 7,749,562 B1 | 7/2010 | Lam et al. |
| 7,763,489 B2 | 7/2010 | Chen et al. |
| 7,767,632 B2 | 8/2010 | Esche, Jr. et al. |
| 7,768,366 B1 | 8/2010 | Patton et al. |
| 7,771,821 B2 * | 8/2010 | Martin et al. ......... 428/408 |
| 7,790,658 B2 | 9/2010 | Sawyer et al. |
| 7,803,347 B2 | 9/2010 | Ajiri |
| 7,816,297 B2 | 10/2010 | Lee |
| 7,846,556 B2 * | 12/2010 | Erdemir et al. ......... 428/687 |
| 7,871,533 B1 | 1/2011 | Haiping et al. |
| 7,952,786 B2 | 5/2011 | Chen et al. |
| 7,955,857 B2 | 6/2011 | Bastide et al. |
| 7,959,891 B2 | 6/2011 | Tenne et al. |
| 7,968,505 B2 | 6/2011 | Liu et al. |
| 7,994,105 B2 | 8/2011 | Narayan |
| 7,998,572 B2 | 8/2011 | McGilvray et al. |
| 8,048,526 B2 | 11/2011 | Mizrahi |
| 8,071,160 B2 * | 12/2011 | Chinn et al. ......... 427/96.6 |
| 8,074,906 B2 | 12/2011 | Talton |
| 8,075,792 B1 | 12/2011 | Branz et al. |
| 8,076,809 B2 | 12/2011 | Tingler et al. |
| 8,114,373 B2 | 2/2012 | Jang et al. |
| 8,117,902 B2 | 2/2012 | Santore et al. |
| 8,221,828 B2 * | 7/2012 | Chinn et al. ......... 427/96.6 |
| 8,322,754 B2 | 12/2012 | Carcagno et al. |
| 8,476,206 B1 | 7/2013 | Malshe |
| 8,486,870 B1 * | 7/2013 | Malshe ......... 508/100 |
| 8,492,319 B2 | 7/2013 | Malshe et al. |
| 8,507,414 B2 * | 8/2013 | Takahama et al. ......... 508/113 |
| 8,507,415 B2 * | 8/2013 | Waynick ......... 508/154 |
| 2005/0002970 A1 | 1/2005 | Ketelson et al. |
| 2005/0064196 A1 | 3/2005 | Martin et al. |
| 2005/0065044 A1 | 3/2005 | Migdal et al. |
| 2005/0124504 A1 | 6/2005 | Zhang et al. |
| 2005/0191357 A1 * | 9/2005 | Kawashima et al. ......... 424/489 |
| 2006/0025515 A1 | 2/2006 | Scaringe et al. |
| 2006/0056752 A1 | 3/2006 | Tibbits |
| 2006/0120947 A1 | 6/2006 | Tenne et al. |
| 2007/0004602 A1 | 1/2007 | Waynick |
| 2007/0117244 A1 | 5/2007 | Chen et al. |
| 2007/0134468 A1 | 6/2007 | Buehler |
| 2007/0158609 A1 | 7/2007 | Hong et al. |
| 2007/0158610 A1 | 7/2007 | Hong et al. |
| 2007/0262120 A1 | 11/2007 | Coleman et al. |
| 2007/0293405 A1 | 12/2007 | Zhang et al. |
| 2008/0029625 A1 | 2/2008 | Talton |
| 2008/0050450 A1 | 2/2008 | Arnold et al. |
| 2008/0066375 A1 | 3/2008 | Roos et al. |
| 2008/0129044 A1 * | 6/2008 | Carcagno et al. ......... 285/94 |
| 2008/0161213 A1 | 7/2008 | Jao et al. |

(56) References Cited

U.S. PATENT DOCUMENTS

| | | | |
|---|---|---|---|
| 2008/0234149 | A1 | 9/2008 | Malshe et al. |
| 2008/0269086 | A1 | 10/2008 | Adhvaryu |
| 2008/0287326 | A1 | 11/2008 | Zhang et al. |
| 2008/0312111 | A1 | 12/2008 | Malshe et al. |
| 2009/0014691 | A1 | 1/2009 | Kint et al. |
| 2009/0018037 | A1* | 1/2009 | Mabuchi et al. ............ 508/165 |
| 2009/0048129 | A1* | 2/2009 | Mabuchi et al. ............ 508/172 |
| 2009/0053268 | A1 | 2/2009 | DePablo et al. |
| 2009/0074522 | A1* | 3/2009 | Graham et al. ............. 407/119 |
| 2009/0118148 | A1* | 5/2009 | Martin et al. ................ 508/109 |
| 2009/0155479 | A1 | 6/2009 | Xiao et al. |
| 2009/0169745 | A1 | 7/2009 | Nohr et al. |
| 2009/0170733 | A1 | 7/2009 | Hwang et al. |
| 2009/0246285 | A1 | 10/2009 | Stellacci et al. |
| 2010/0029518 | A1 | 2/2010 | Markovitz et al. |
| 2010/0092663 | A1 | 4/2010 | Ajiri |
| 2010/0099590 | A1 | 4/2010 | Liu |
| 2010/0204072 | A1 | 8/2010 | Kwon et al. |
| 2010/0227782 | A1 | 9/2010 | Tenne et al. |
| 2010/0261625 | A1* | 10/2010 | Hakamata .................... 508/103 |
| 2010/0298180 | A1 | 11/2010 | Patel et al. |
| 2011/0059876 | A1 | 3/2011 | Takahama et al. |
| 2011/0118156 | A1 | 5/2011 | Ruhle et al. |
| 2011/0136708 | A1 | 6/2011 | Mabuchi et al. |
| 2011/0166051 | A1 | 7/2011 | Mizrahi et al. |
| 2011/0172132 | A1 | 7/2011 | Branson et al. |
| 2011/0206596 | A1 | 8/2011 | Tenne et al. |
| 2011/0229580 | A1 | 9/2011 | Srivastava et al. |
| 2011/0244692 | A1* | 10/2011 | Jeong et al. .................. 438/758 |
| 2011/0257054 | A1 | 10/2011 | Baran, Jr. et al. |
| 2011/0287987 | A1 | 11/2011 | Mordukhovich et al. |
| 2012/0032543 | A1 | 2/2012 | Chakraborty et al. |

FOREIGN PATENT DOCUMENTS

| | | |
|---|---|---|
| JP | 10195473 A | 7/1998 |
| JP | 10330779 A | 12/1998 |
| JP | 2006-045350 | 2/2006 |
| WO | WO 95/02025 A1 | 1/1995 |
| WO | WO 98/24833 A1 | 6/1998 |
| WO | WO 2005/060648 | 7/2005 |
| WO | WO 2006/076728 | 7/2006 |
| WO | WO 2006/134061 | 12/2006 |
| WO | WO 2007/082299 | 7/2007 |

OTHER PUBLICATIONS

Dmytryshyn, S.L., et al., "Synthesis and characterization of vegetable oil derived esters: evaluation for their diesel additive properties", Bioresource Tech. (2004) 92:55-64.

Hsu, S.M., et al., "Boundary lubricating films: formation and lubrication mechanism", Tribology Int'l (2005) 38:305-312.

Hu, J.J. et al., "Synthesis and microstructural characterization of inorganic fullerene-like MoS2 and graphite-MoS2 hybrid nanoparticles", J. Mater. Res. (2006) 21(4):1033-1040.

Jiang, W. et al., "Cubic boron nitride (cBN) based nanocomposite coatings on cutting inserts with chip breakers for had turning applications", Surface & Coatings Technology (2005) 200:1849-1854.

Li, B. et al., "Tribochemistry and antiwear mechanism of organic-inorganic nanoparticles as lubricant additives", Technology Letters (2006) 22(1):79-84.

Malshe, A.P. et al., "Nanostructured coatings for machining and wear-resistant applications", JOM (2002) 28-30.

Menezes, P.L. et al., "Studies on friction and transfer layer: role of surface texture", Tribology Letter (2006) 24(3):265-273.

Minami, I. et al., "Antiwear properties of phosphorous-containing compounds in vegetable oils", Tribology Letter (2002) 13(2):95-101.

Moshkovith, A. et al., "Friction of fullerene-like WS2 nanoparticles; effect of agglomeration", Tribology Letter (2006) 24(3):225-228.

Ozkan et al., "Femtosecond laser-induced periodic structure writing on diamond crystals and microclusters", Applied Physics Letters, vol. 75, No. 23, Dec. 6, 1999, pp. 3716-3718.

Rao, C.N.R. et al., "Inorganic nanotubes", Dalton Trans. (2003) 1-24.

Russell, W.C. et al., "CBN-TiN composite coating using a novel combinatorial method—structure and performance in metal cutting", J. Mfg. Sci. Eng. (2003) 125:431-434.

Spikes, H., The thickness, friction and wear of lubricant files, a PowerPoint presentation given at the SAE Powertrain & Fluid Systems Conference and Exhibition, San Antonio, Texas (Oct. 25, 2005).

Verma, A. et al., "Exploring mechanical synthesis of inorganic nanoparticles of MoS2 lubricant and its composite with organic medium for advanced manufacturing", ISNM (2006) Paper No. 33.

Wu, J.-H. et al., "Bio-inspired surface engineering and tribology of MoS2 overcoated cBN-TiN composite coating", Wear (2006) 261(5-6):592-599.

Yedave, S.N. et al., "Novel composite CBN-TiN coating; synthesis and performance analysis", J. Mfg. Processes (2003) 5(2):154-162.

Spalvins, T. "A review of recent advances in solid film lubrication", J. Vac. Sci. Technol/ A (1987) 5(2):212-219.

Canter, Dr. Neil, "EP nanoparticles-based lubricant package", Tribology & Lubrication Technology, Apr. 2009, pp. 12-17.

Demydov, Ph.D., Dmytro, "Progress Report (2nd Quarter) Advanced Lubrication for Energy Efficiency, Durability and Lower Maintenance Costs of Advanced Naval Components and Systems", NanoMech, LLC, prepared for Office of Naval Research for the period of Feb. 20, 2010-May 19, 2010, 34 pages.

Verma et al., "Tribological Behavior of Deagglomerated Active Inorganic Nanoparticles for Advanced Lubrication", Tribology Transactions, Sep. 1, 2008, 51: pp. 673-678.

Adhvaryu, Dr. Antanu, "Multi-component Nanoparticle Based Lubricant Additive to Improve Efficiency and Durability in Engines", Caterpillar Inc., Aug. 7, 2008, 27 pages.

Verma, Arpana, "Fundamental Understanding of the Synthesis and Tribological Behavior of Organic-Inorganic Nanoparticles", Dec. 2008, University of Arkansas, 147 pages.

Berdinsky et al., "Synthesis of MoS2 nanostructures from nano-size powder by thermal annealing", Electron Devices and Materials (2000), EDM (2000) Siberian Russian Student Workshops on Sep. 19-21, 2000, Piscataway, NJ, USA, pp. 20-28.

Cizaire et al., "Mechanisms of ultra-low friction by hollow inorganic fullerene-like MoS2 nanoparticles", Surface and Coatings Technology (2002) 160(2-3): pp. 282-287.

Huang et al., "Friction and wear properties of IF-MOS2 as additive in Paraffin oil," Tribology Letters, vol. 20, Nos. 3-4, Dec. 2005, pp. 247-250.

Rapoport et al., "Fullerene-like WS2 nanoparticles: superior lubricants for harsh conditions", Advanced Materials, Apr. 17, 2003, vol. 15, Nos. 7-8, pp. 651-655.

Hu, Xianguo, "On the size effect of molybdenum disulfide particles on tribological performance", Industrial Lubrication and Tribology, 2005, vol. 57, Issue 6, pp. 255-259.

International Search Report issued in connection with PCT/US13/46964 dated May 2, 2014.

\* cited by examiner

TEXTURED SURFACES TO ENHANCE NANO-LUBRICATION

CROSS REFERENCE TO RELATED APPLICATIONS

This patent application is a continuation application and claims the benefit of the filing date under 35 U.S.C. §120 of U.S. patent application Ser. No. 13/540,256, filed on Jul. 2, 2012, now U.S. Pat. No. 8,486,870, issued on Jul. 16, 2013. U.S. patent application Ser. No. 13/540,256 is incorporated by reference into this specification.

BACKGROUND

1. Field of Invention

Embodiments of the present invention relate generally to nano-lubrication, that is lubrication using nano-materials. More specifically, embodiments of the present invention relate to preparation of surfaces to be lubricated to enhance the effectiveness of intended nano-lubrication.

2. Description of Related Art

Nano-materials have been developed and used for lubrication and other purposes. Nano-materials have also been used with other materials for lubrication and other purposes. However, this knowledge is still in its infancy and a need exists to enhance the effectiveness of nano-lubrication.

SUMMARY OF EMBODIMENTS OF THE INVENTION

Embodiments of the present invention may provide textured surfaces to be lubricated, the texturing to enhance the effectiveness of the intended nano-lubrication. The word "texture" refers to a physical and/or chemical patterning on the surfaces to be lubricated, also referred to herein as the application surface or the substrate. The texturing may make asperities and depressions in the surface to be lubricated with or without chemical functionalization. This texturing may be executed, for example, by chemical etching, laser etching, mechanical machining or other techniques. This texturing may create locations in the lubricated surface to hold or anchor the intended nano-lubricants, to facilitate the creation of a lubricating tribo-film on the application surface when the surface is used under pressure, temperature and other stress factors, and resulting in delivery of multiple chemistries from the nano-lubricant.

In non-limiting embodiment, a textured surface and a method of making a textured surface according to the present disclosure comprises a surface with textured features and methods of making the textured features. The textured features are adapted to enhance the effectiveness of a nano-particle lubricant. In a non-limiting embodiment the features are formed by one or more processes selected from the group consisting of etching, chemical etching, chemical functionalization, laser etching, laser blasting, sand blasting, physical etching, mechanical etching, top down processes, bottom up processes, chemical texturing, physical texturing, mechanical texturing, stamping, laser texturing, vapor deposition, plasma deposition, electroplating, self assembly, directed assembly, subtractive manufacturing, additive manufacturing, hybrid manufacturing, and other deposition. The textured features may comprise at least one feature selected from the group consisting of pores, waves, striations, channels, protrusions, asperities, depressions, grooves, holes, low points, high points, cracks, low areas, high areas, exposed sandwiched layers, and chemically functional material.

A nano-particle lubricant is in contact with the textured features of the textured surface in a position to lubricate the surface. In non-limiting embodiments, the nano-particle lubricant comprises at least one member selected from the group consisting of: (i) solid nano-particles, (ii) a layered nano-particle macro-composition, (iii) a bonded plurality of layered nano-particle macro-compositions, (iv) nanoparticles having an open-ended architecture and comprising an organic medium intercalated in the nanoparticle, (v) a nanoparticle inner nucleus, an intermediate layer around the nucleus, and an outer layer intercalated with the nucleus or encapsulating the nucleus and the intermediate layer, and (vi) a plurality of nanoparticle inner nuclei, on each nucleus, an outer layer intercalated with the nucleus or encapsulating the nucleus, the layer with the nucleus forming a layered nanoparticle, and a plurality of bonds, each bond bonded to at least two of the layered nanoparticles, such that each layered nanoparticle is bonded to at least one other of the layered nanoparticles by a bond.

In a non-limiting embodiment according to the present disclosure, a tribo-film is in contact with the textured features of the textured surface in a position to lubricate the surface. In another non-limiting embodiment according to the present disclosure, the tribo-film comprises at least one of a phosphorus-containing compound, a phosphide, a boron containing compound, and a boride. In still another non-limiting embodiment, the tribo-film comprises at least a component of the nano-particle lubricant. According to non-limiting aspects of the present disclosure, the size of one or more of the textured features is a multiple of the size of a unit of the nano-particle lubricant, and the surface comprises a substrate with a layer of material deposited over the substrate, where the textured features expose parts of the substrate.

BRIEF DESCRIPTION OF THE DRAWINGS

Embodiments of the present invention are described herein, by way of example, in conjunction with the following figures.

EMBODIMENTS OF THE PRESENT INVENTION

Figure 1:
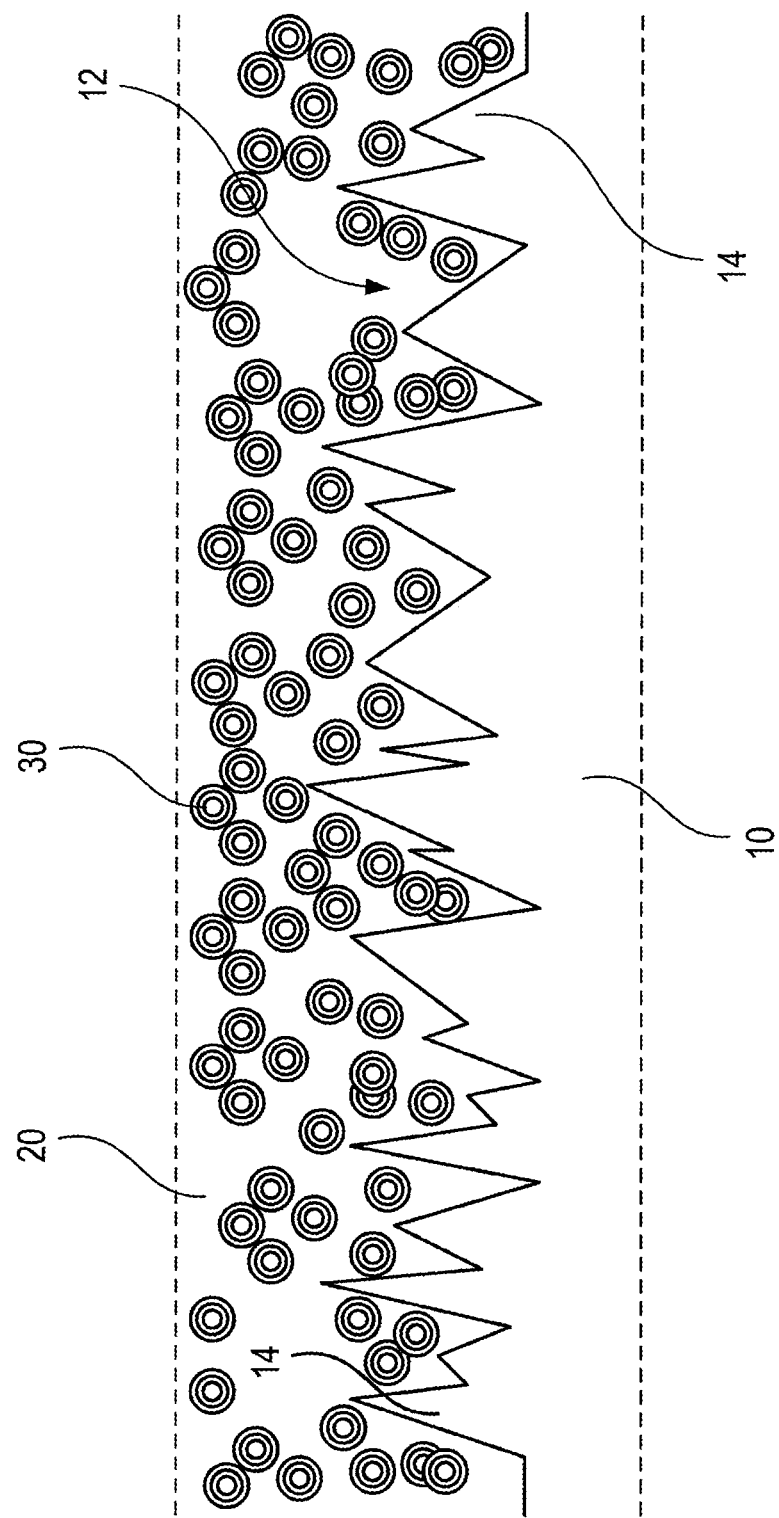
FIG. 1 is a schematic diagram illustrating a textured surface and a layer of nano-lubricants located on the surface.

Embodiments of the present invention may provide textured surfaces to be lubricated, the texturing to enhance the effectiveness of the intended nano-lubrication. The texturing may make asperities and depressions in the surface to be lubricated that can mechanically anchor or mechanically interlock the nano-lubricant to the surface. Texturing may also include chemical functionalization of all or a portion of the application surface, and the chemical functionalization may be directed to various patterns on the application surface.

The term "chemical functionalization" as used herein refers to the attachment or bonding of various chemical groups to the application surface, wherein the functionalized surface can then form chemical bonds with suitably chemically functionalized nano-lubricants.

In non-limiting embodiments, this texturing may be executed, for example, by one or more of etching, chemical etching, chemical functionalization, laser etching, laser blasting, sand blasting, physical etching, mechanical etching, top down processes, bottom up processes, chemical texturing, physical texturing, mechanical texturing, stamping, laser texturing, vapor deposition, plasma deposition, electroplating, self assembly, directed assembly, subtractive manufacturing, additive manufacturing, hybrid manufacturing, and other deposition. This texturing may create locations in the lubricated surface to hold or anchor the intended nano-lubricants, which, in non-limiting embodiments, may be introduced to the application surface as a suspension, dispersion, or emulsion in a medium such as, for example, an oil. As used herein, the terms "anchor" or "anchoring" mean that the nano-lubricant is held to the application surface through various means, including, but not limited to mechanical interlocking; chemical bonding, such as, for example, covalent bonding, ionic bonding, London dispersion forces, electrostatic forces, hydrogen-bonding; and by other biases such as, for example, a magnetic field, until the nano-lubricant is released from the surface as a result of use under pressure to form a tribo-film adjacent to the surface to be lubricated. The anchored nano-lubricant is used to facilitate the creation of a tribo-film on the surface, as a result of releasing the anchored lubricant when the textured surface is used under stress such as pressure and temperature, and results in delivery of multiple chemistries from the nano-lubricant.

In various embodiments, the nano-lubricant may be a layered or an open architecture nanoparticle, as described in U.S. patent application Ser. No. 12/160,758 (U.S. Publication No. 2008/0312111 A1), for "Nanoparticle Compositions and Methods of Making and Using The Same," by Malshe et al., which is incorporated by this reference into this specification in its entirety. The nanoparticles may be solid lubricant nanoparticles. The nanoparticles may be made from starting materials or solid lubricant starting materials. Examples of solid lubricants may include, but are not limited to, layered materials, suitably chalcogenides, more suitably, molybdenum disulphide, tungsten disulphide, or a combination thereof. Another suitable layered material is graphite or intercalated graphite. Other solid lubricants that may be used alone or in combination with the layered materials are polytetrafluoroethylene, boron nitride (suitably hexagonal boron nitride), soft metals (such as silver, lead, nickel, copper), cerium fluoride, zinc oxide, silver sulfate, cadmium iodide, lead iodide, barium fluoride, tin sulfide, zinc phosphate, zinc sulfide, mica, boron nitrate, borax, fluorinated carbon, zinc phosphide, boron, or a combination thereof. Fluorinated carbons may be, without limitation, carbon-based materials such as graphite which has been fluorinated to improve its aesthetic characteristics. Such materials may include, for example, a material such as $CF_x$ wherein x ranges from about 0.05 to about 1.2.

Other nano-lubricants that may be used include, for example, the nanoparticle of macro-compositions described in U.S. Application patent Ser. No. 13/540,235, filed Jul. 2, 2012, for "Nanoparticle Macro-Compositions" by Malshe, which is incorporated by this reference into this specification in its entirety. Non-limiting embodiments of the present invention may include a macro-composition with a special structure. The term "macro-composition", as used herein, is a term to describe embodiments of the present invention. The structure includes a layered macro-composition made of a nanoparticle as an inner nucleus, an intermediate layer around the nucleus, and an outer layer intercalated with the nucleus or encapsulating the nucleus and the intermediate layer. A plurality of the layered macro-compositions is bonded together by bonds, so that each layered macro-composition is bonded to at least one other such layered macro-composition. Embodiments include a macro-composition made of three 3-layered macro-compositions joined in a chain by two bonds. These macro-composition assemblies may take the shape of layered macro-compositions bonded together in chains, or forming other shapes, such as rings. The layered macro-composition may be about 20 nanometers in size, for example. The bonds of the complex macro-composition may have an average length of no more than about 100 nanometers, for example. Embodiments of a macro-composition, may be available from NanoMech, Inc., in Springdale, Ark.

In various embodiments, the surface to be lubricated may be textured using nanoscale laser etching, for example, in a sub-micron scale. This laser etching is described in a paper by Malshe, et al., entitled "Femtosecond laser-induced periodic structure writing on diamond crystals and microclusters" in Applied Physics Letters, 6 Dec. 1999, Vol. 75, Number 23, pp. 3716-3718, which is incorporated in its entirety into this specification by this reference.

Layered Surfaces

In an alternative embodiment of the present invention, materials may be deposited in layers on the surface to be lubricated, by for example vapor deposition, plasma deposition, electroplating, or otherwise. This surface with deposition layers may then be etched by, for example, laser-etching, chemical etching, or otherwise. This etching may provide a surface texture to expose chemically receptive materials in depressions or other features between asperities in the surface to bond or with nano-particles intended as nano-lubricants, to form tribo-films in the depressions. For example, the textured surface may react with phosphorus-containing compounds or phosphides in layered nano-lubricant particles, which phosphorus-containing compounds or phosphides may be released under pressure during use of the lubricated surface, to form glossy tribo-films in the depressions or other features.

Figure 6:
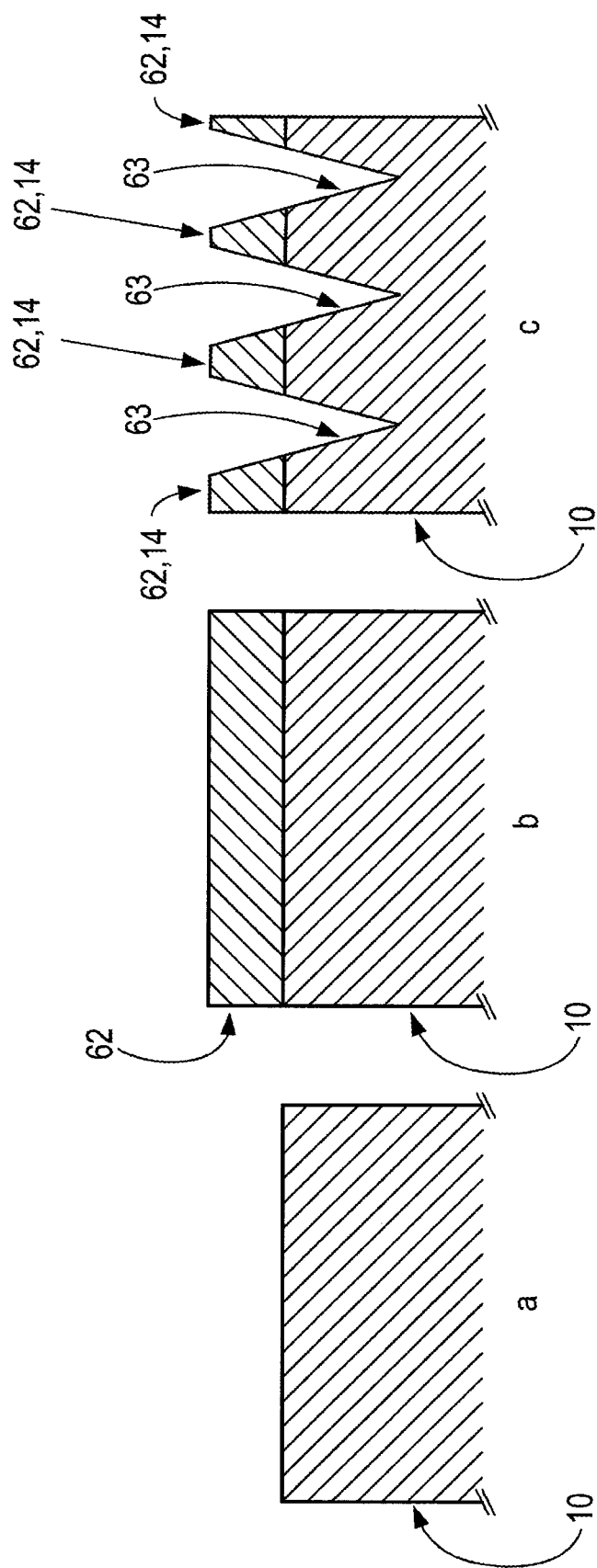
FIG. 6 shows an embodiment with materials deposited on a substrate, and then etched exposing portions of the substrate.

FIG. 6(a) shows an embodiment of a surface to be lubricated with substrate 10. FIG. 6(b) shows a layer 62 of material deposited on the substrate 10. FIG. 6(c) shows the embodiment after etching of the deposited layer 62, which exposes portions of the substrate 10, while leaving portions of the deposited layer 62. This creates textured features including asperities 14, and low areas 63 between asperities 14. The bottom of the low areas 63 consist of substrate 10, and the tops of the asperities consist of deposited material 62. This may allow, for example, the bottom of the asperity 14, consisting of substrate 10, to react with and bond to the nano-lubricant in a manner different from the top of the asperities 14, consisting of deposited material 62.

Texture, Residence Time, and Anchoring

In various embodiments, either the nano-lubricant, or the lubricated surface, or both the lubricant and the lubricated surface, may be textured in one or more ways to enhance the effectiveness of the lubrication. The nano-lubricants may be closed architecture and/or open architecture lubricants.

The texturing may be, for example, physical, chemical, mechanical, by laser, or otherwise, or a combination of these methods. This texturing may facilitate the lubricant being anchored onto the textured surface. The anchoring may comprise at least one or more of a mechanical anchoring, a chemical bond anchoring, or other bias such as magnetic field anchoring.

In various embodiments, texturing of the surface to be lubricated can provide an open architecture for the surface to be lubricated. As an example, chemical etching of the surface is a form of chemical texturization. Open architecture is a term that is sometimes used to refer to the structure of a material that tends to promote intercalation of other materials, or the bonding, attachment, localization, anchoring, or other attraction of other materials to the open architectured item on the surface and/or inside the core shell.

The effect of the texturing is to enhance the residence time of the lubricant at the lubricated mated surfaces, and to enhance the efficiency and effectiveness of the lubricant particles. The periodicity or period of the residence time when the lubricant is localized at the lubricated surface may be is defined as short range, medium range, or long range.

A Delivery System

Texturing mated lubricated surfaces can be viewed as a type of delivery system, where in the components of the layered nanoparticle lubricant are delivered to the surface of the mated lubricated surfaces. This delivery may occur when a multi-layered nano-particle lubricant is deformed and breaks down under use at the textured lubricated surface delivering, for example, its intermediate layer of phosphorus-containing compounds to the surface.

Size and Parameters of Textured Features

The size of the textured features at the mated lubricated surface, for example, the size of the depressions between neighboring asperities, may be measured as N times the size of the lubricant unit (for example, a multi-layered nano-composition, molecule, or otherwise). For example, if it were intended that a multi-layered nanoparticle composition, with a particle size of about 20 nanometers, would be used as the lubricant, then texturing of the lubricated surfaces may be designed to be about 2 times the size of this nano-lubricant, that is, 40 nanometers across a depression between neighboring asperities. The resulting density of the texturing may be the referred to as the size of the repeating textured features, or for example, the distance to repeating asperities.

Texturing of the mated lubricated surfaces may have several basic parameters. These may include (1) the size of the textured features (for example, the distance of depressions between neighboring asperities), (2) the primary and secondary order of the texturing (for example, the height of the asperities or the depth of the depressions or the periodicity of the asperities), (3) the density (the number of repeating physical characteristics of the texturing in a given area or distance), (4) a combination of physical and chemical texturing (chemical texturing may include the deposition of functional or molecular groups that would attach nano-lubricants to the lubricated surfaces), and (5) the direction of motion of the mated lubricated parts with respect to the orientation of texture. In a non-limiting embodiment, texturing the surface to form the features to enhance the effectiveness of a nanoparticle lubricant comprises chemical texturing. In still another non-limiting embodiment, chemical texturing comprises chemically functionalizing at least a portion of the substrate.

Texturing of the nano-lubricant particles may include various fundamentals and parameters including (1) a multi-component chemistry of the layered nano-lubricant particles (see, for example, U.S. patent application Ser. No. 12/160,758 for "Nanoparticle Compositions and Methods of Making and Using the Same" by Malshe for a description of some possible multi-component chemistries) and the placement of the nano-lubricant particles on a lubricated surface, (2) physical or chemical openness of the texture in the layered nano-particles (chemical openness here refers to the tendency of the lubricant to chemically attach to the lubricated surface), (3) the textured lubricant particle bond or linkage to dispersion media and application media (for example, multi-layered nano-particle lubricants may be intercalated with longer chain hydrocarbon oil molecules to form macro-compositions or macromolecules for lubricants, as described in patent application Ser. No. 13/540,235 for "Nano-particle Macro-Compositions" by Malshe), and (4) the texturing of the nano-particle lubricant to give the nanoparticle chemical and/or physical texture complimentary to the mated lubricated surface. For example, functional chemical groups attached to the nanoparticle lubricants may attach the lubricant particles to the lubricated textured surfaces through covalent bonding, ionic bonding, London dispersion forces, electrostatic forces, hydrogen-bonding and other known forms of chemical bond formation.

Types of Textured Features

Physical texturing of the nanoparticle lubricants, and/or the mated lubricated surfaces may provide various textured features, including, for example, pores, waviness, striations, channels, protrusions, asperities, depressions, grooves, holes, low points, high points, cracks, low areas, high areas, exposed sandwiched layers, and other features. The physical texturing of the nano-lubricant particles and/or lubricated surfaces may be executed by processes including chemical etching, laser etching, laser blasting, sand blasting, top-down processes, physical etching, mechanical etching, and otherwise.

Chemical texturing of the nanoparticle lubricants and the lubricated mated surfaces may include features such as, for example, multi-component chemistries (in the nano-particle lubricants) in combination with the preceding physical texturing features or processes. Processes for chemical texturing of the lubricant and lubricated surfaces may include fractionalization (e.g. the attachment of chemically active elements or chemical groups), using bottom up chemical processes such as solutions or vapor deposition.

The processes and features of physical texturing and chemical texturing of the nanoparticle lubricants and the textured surfaces may be integrated for a specific application and a specific design criteria, for a designed custom lubrication application.

DETAILED DISCUSSION OF THE FIGURES

FIG. 1

FIG. 1 is a schematic diagram illustrating a textured surface and a layer of nano-lubricants located on the surface. By way of example, referring to FIG. 1, a substrate 10 comprises a textured surface 12. The textured surface 12 comprises asperities 14. The asperities 14 of the textured surface 12 may be formed using a texturing process as described herein. Alternatively, the asperities 14 of the textured surface 12 may form as a result of the general production or processing of the substrate 10. A lubricant layer 20 is located on the textured surface 12 of the substrate 10. The lubricant layer 20 comprises nano-lubricants 30. The nano-lubricant particles 30 are shown for convenience in FIG. 1 and other figures herein as round or spherical; however, note that actually the nano-lubricant particles 30 may be irregular shaped, or ovaloid, and in any case have an open architecture facilitating intercalation and other types of attachment and bonding.

The nano-lubricants 30 may, for example, comprise layered nanoparticle macro-compositions as described in U.S. patent application Ser. No. 12/160,758 (U.S. Publication No.

2008/0312111 A1) for "Nanoparticle Compositions and Methods of Making and Using The Same," by Malshe et al. The nano-lubricants 30 may, for example, comprise nanoparticle macro-compositions as described in U.S. Application patent Ser. No. 13/540,235, filed Jul. 2, 2012, for "Nanoparticle Macro-Compositions" by Malshe.

FIG. 2

Figure 2:
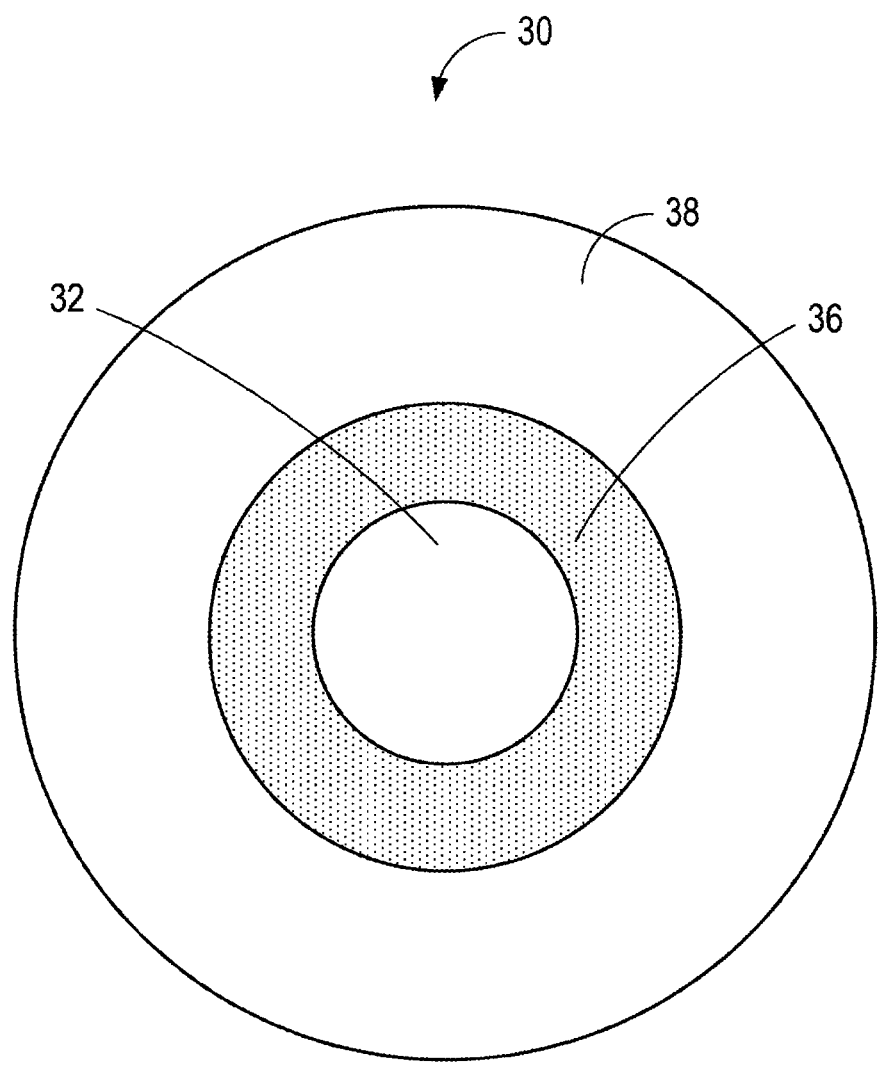
FIG. 2 is a schematic diagram illustrating a nano-lubricant.

FIG. 2 is a schematic diagram illustrating a solid nano-lubricant. For example, referring to FIG. 2, the nano-lubricants 30 may comprise a layered macro-composition comprising an inner nucleus 32, an intermediate layer 36 encapsulating the inner nucleus 32, and an outer layer 38 encapsulating the inner nucleus 32 and the intermediate layer 36. The intermediate layer 36 and the outer layer 36 may independently comprise at least one organic material. The intermediate layer 36 and the outer layer 38 may comprise the same or a different organic material. The inner nucleus 32 may be intercalated with an organic material comprising the intermediate layer 36 and/or the outer layer 38.

The inner nucleus 32 may comprise at least one solid nanoparticle material selected from the group consisting of chalcogenides, molybdenum disulphide, tungsten disulphide, graphite, boron nitride, polytetrafluoroethylene, hexagonal boron nitride, soft metals, silver, lead, nickel, copper, cerium fluoride, zinc oxide, silver sulfate, cadmium iodide, lead iodide, barium fluoride, tin sulfide, zinc phosphate, zinc sulfide, mica, boron oxide, borax, fluorinated carbon, zinc phosphide, boron, and combinations thereof.

The intermediate layer 36 and/or the outer layer 38 may independently comprise at least one organic material selected from the group consisting of lecithins, phospholipids, phosphides, soy lecithins, detergents, glycerides, distilled monoglycerides, monoglycerides, diglycerides, thiol phosphate and related complexes, acetic acid esters of monoglycerides, organic acid esters of monoglycerides, sorbitan esters of fatty acids, propylene glycol esters of fatty acids, polyglycerol esters of fatty acids, compounds containing phosphorous, compounds containing sulfur, compounds containing nitrogen, oil, grease, alcohol, composite oil, canola oil, vegetable oils, soybean oil, corn oil, ethyl and methyl esters of rapeseed oil, hydrocarbon oils, alkanes such as n-hexadecane, and combinations thereof.

Referring to FIG. 1, the lubricant layer 20 located on the textured surface 12 of the substrate 10 may comprise, consist essentially of, or consist of the nano-lubricants 30. For example, the lubricant layer 20 may comprise the nano-lubricants 30 added as lubrication enhancers to an amount of a base lubricant such as, for example, grease, oil, gear oil, lithium complex grease, paste and protective surface coatings.

FIG. 3

Figure 3:
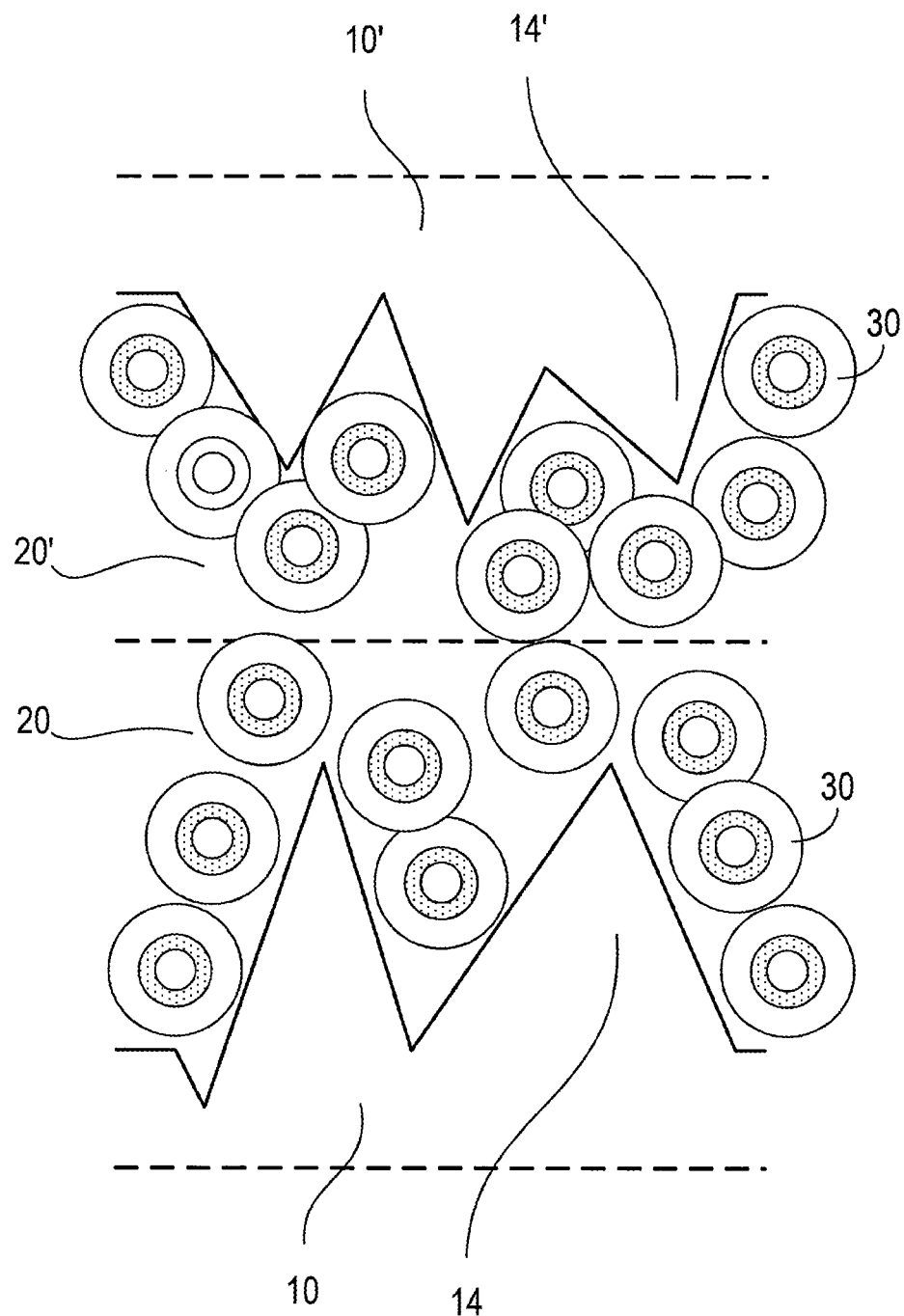
FIG. 3 is a schematic diagram illustrating two textured surfaces approaching frictional contact, each textured surface having a layer of nano-lubricants located on the surface.

FIG. 3 is a schematic diagram illustrating two textured surfaces approaching frictional contact, each textured surface having a layer of nano-lubricants located on the surface. FIG. 3 shows two substrates 10, 10' each comprising textured surfaces comprising asperities 14, 14'. Lubricant layers 20, 20' are located on the textured surfaces of the substrates 10, 10', and the lubricant layers 20, 20' each comprise nano-lubricants 30. The substrates 10, 10' are shown as approaching frictional contact between the respective textured surfaces. The nano-lubricants 30 localize into the spaces between the asperities 14, 14' on the respective textured surfaces.

FIG. 4

Figure 4:
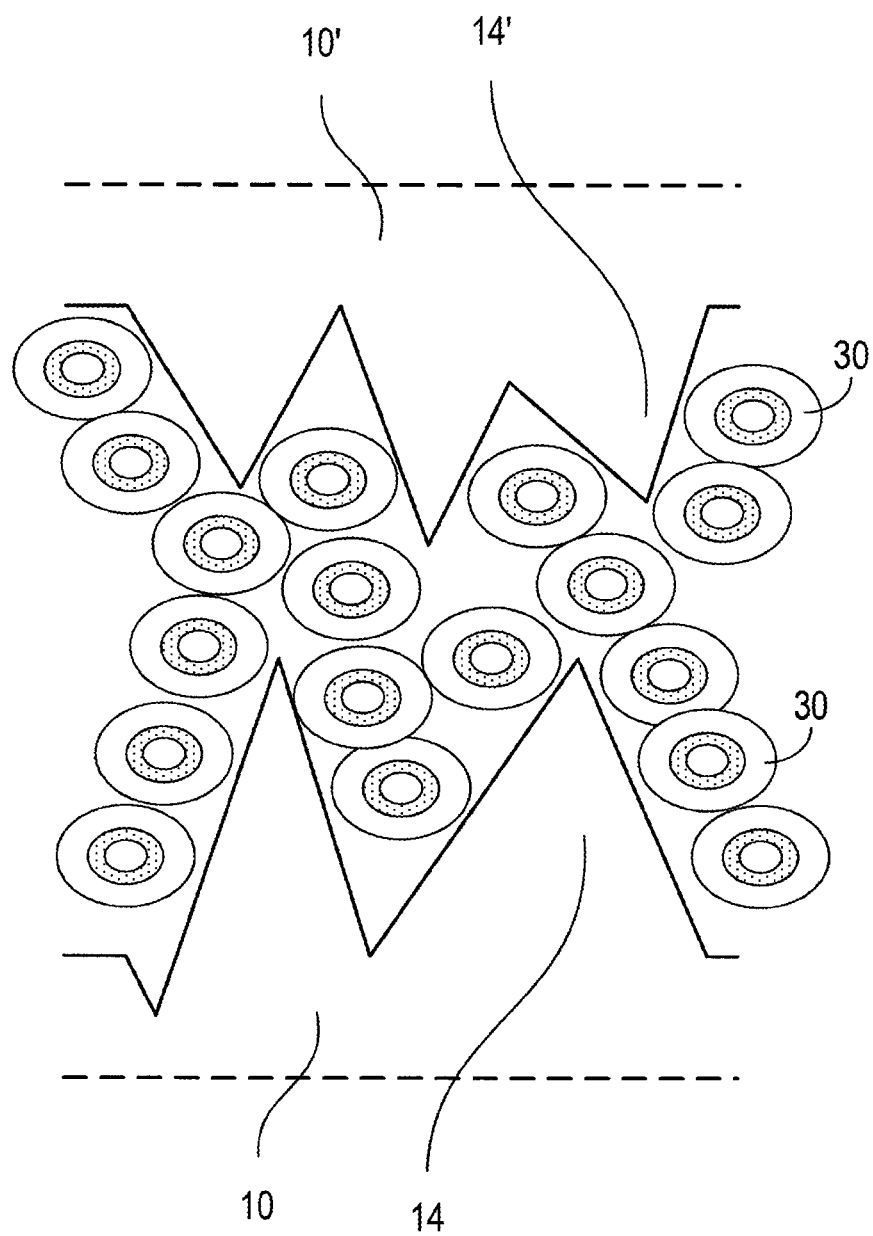
FIG. 4 is a schematic diagram illustrating two textured surfaces approaching frictional contact and showing plastic deformation of nano-lubricants located on the surfaces.

FIG. 4 is a schematic diagram illustrating two textured surfaces approaching frictional contact and showing plastic deformation of nano-lubricants located on the surfaces. As the distance decreases between the respective surfaces of the substrates 10, 10', the mechanical stress (pressure) on the nano-lubricants 30 increases. This plastically deforms the nano-lubricants 30, as shown in FIG. 4. The plastic deformation of the nano-lubricants 30 due to applied stress between the two surfaces in frictional contact may disrupt the layered structure of the nano-lubricants (closed as well as open architecture), thereby breaking up the layered nano-lubricant particles and releasing organic materials comprising the intermediate layer 36 and/or the outer layer 38.

Figure 5:
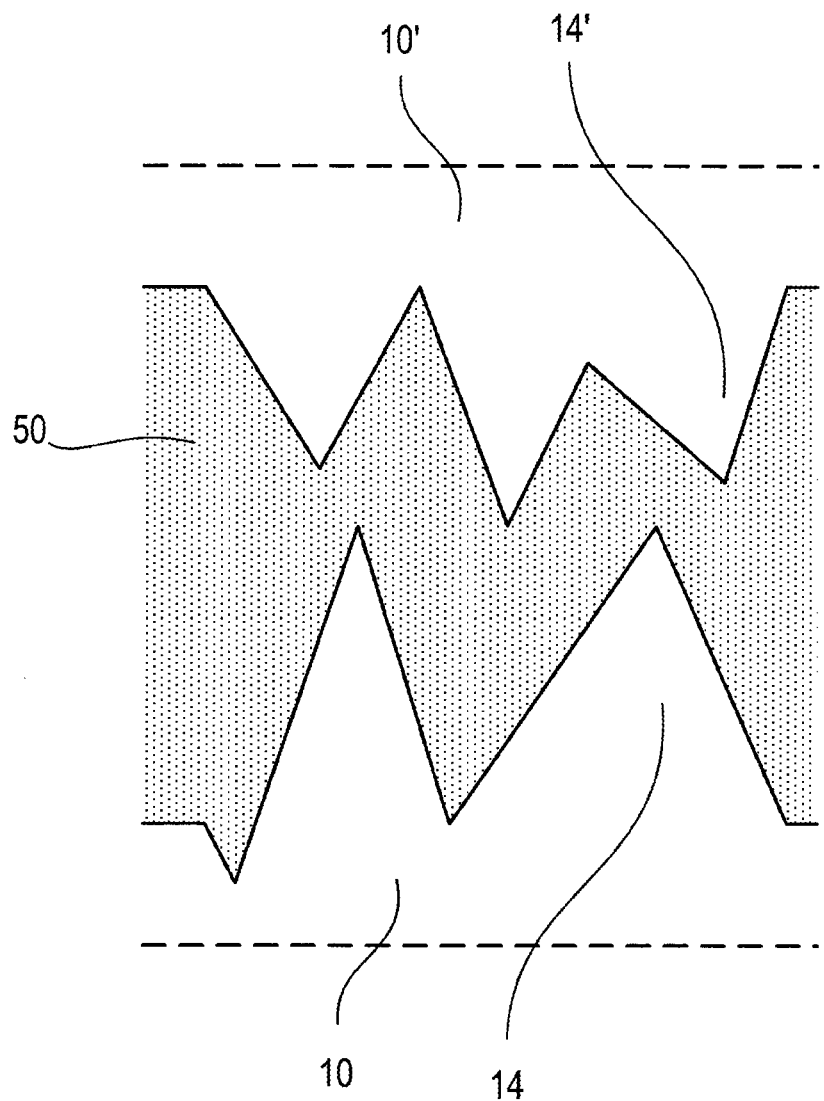
FIG. 5 is a schematic diagram illustrating two textured surfaces in frictional contact with a tribofilm formed from deformed nano-lubricants located between the surfaces.

Delivery and the Tribo-Film: FIG. 5

FIG. 5 is a schematic diagram illustrating two textured surfaces in frictional contact with a tribo-film formed from deformed nano-lubricants located between the surfaces. The organic material(s) is(are) released in situ on the lubricated surfaces of the substrates 10, 10' and in the spaces between the asperities 14, 14'. This provides targeted and site-specific delivery of the organic material(s), which may coalesce into a tribofilm 50, as shown in FIG. 5. The tribofilm 50 provides enhanced nano-lubrication between the respective surfaces of the substrates 10, 10' in frictional contact. In various embodiments, wherein the nano-lubricants 30 comprise different organic materials, the resulting tribofilm 50 may comprise multiple chemistries that provide enhanced lubricity. For example, the tribofilm 50 may comprise a mixture of phospholipids, phosphides, borates, amides and/or other phosphorus-containing and other compounds and the material comprising the inner nucleus 32, such as, for example, graphite, boron nitride, chalcogenides, molybdenum disulphide, tungsten disulphide, zirconium oxide or other chalcogenides. In a non-limiting embodiment, the tribo-film formed from deformed nano-lubricants includes at least one of a phosphorus-containing compound, a phosphide, a boron-containing compound, and a boride. In a non-limiting embodiment, the tribo-film formed from deformed nano-lubricants includes at least a component of the nano-particle lubricant.

OTHER MATTERS

It is to be understood that the invention is not limited in its application to the details of construction and the arrangement of components set forth in the description or illustrated in the drawings herein. The invention is capable of other embodiments and of being practiced or of being carried out in various ways. Also, it is to be understood that the phraseology and terminology used herein is for the purpose of description and should not be regarded as limiting.

Any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

The invention claimed is:

1. A lubricated surface comprising:
   a surface with textured features, wherein the textured features are adapted to enhance the effectiveness of a nano-particle lubricant, and
   a nano-particle lubricant in contact with the textured features of the textured surface in a position to lubricate the surface, wherein the nano-particle lubricant comprises a suspension, dispersion, or emulsion of nano-particles in a base material.

2. The lubricated surface of claim 1, wherein the nano-particles have an average particle dimension of less than or equal to about 100 nm.

3. The lubricated surface of claim 1, wherein the nano-particles comprise solid nano-particles.

4. The lubricated surface of claim 3, wherein the solid nano-particles comprise at least one material selected from the group consisting of molybdenum disulphide, tungsten disulphide, graphite, intercalated graphite, polytetrafluoroethylene, boron nitride, hexagonal boron nitride, soft metals, silver, lead, nickel, copper, cerium fluoride, zinc oxide, silver sulfate, cadmium iodide, lead iodide, barium fluoride, tin sulfide, zinc phosphate, zinc sulfide, mica, boron nitrate, borax, fluorinated carbon, zinc phosphide, boron, and combinations of any thereof.

5. The lubricated surface of claim 1, wherein the nano-particles comprise layered nano-particles.

6. The lubricated surface of claim 1, wherein the nano-particles comprise at least one type of layered nano-particles selected from the group consisting of molybdenum disulfide nano-particles, tungsten disulfide nano-particles, graphite nano-particles, boron nitride nano-particles, and combinations of any thereof.

7. The lubricated surface of claim 1, wherein the nano-particles comprise at least one layered material comprising a chalcogenide.

8. The lubricated surface of claim 1, wherein nano-particles comprise molybdenum disulfide nano-particles.

9. The lubricated surface of claim 1, wherein the nano-particles comprise nano-particles having an open architecture.

10. The lubricated surface of claim 1, wherein the nano-particles comprise an organic medium intercalated in the nano-particles.

11. The lubricated surface of claim 10, wherein the organic medium comprises at least one material selected from the group consisting of oil mediums, grease mediums, alcohol mediums, composite oil, canola oil, vegetable oil, soybean oil, corn oil, ethyl and methyl esters of rapeseed oil, distilled monoglycerides, monoglycerides, diglycerides, acetic acid esters of monoglycerides, organic acid esters of monoglycerides, sorbitan, sorbitan esters of fatty acids, propylene glycol esters of fatty acids, polyglycerol esters of fatty acids, hydrocarbon oils, n-hexadecane, phospholipids, and combinations of any thereof.

12. The lubricated surface of claim 10, wherein the organic medium comprises an oil medium selected from the group consisting of composite oil, canola oil, vegetable oil, soybean oil, corn oil, hydrocarbon oil, and combinations of any thereof.

13. The lubricated surface of claim 10, wherein the organic medium comprises a vegetable oil.

14. The lubricated surface of claim 10, wherein the organic medium comprises a phospholipid.

15. The lubricated surface of claim 1, wherein the nano-particles comprise nano-particles having an open architecture and an organic medium intercalated in the nano-particles.

16. The lubricated surface of claim 1, wherein the nano-particles are intercalated and encapsulated with an organic medium.

17. The lubricated surface of claim 1, wherein the nano-particles comprise a layered nano-particle macro-composition.

18. The lubricated surface of claim 1, wherein the nano-particles comprise a bonded plurality of layered nano-particle macro-compositions.

19. The lubricated surface of claim 1, wherein the nano-particles comprise a nano-particle inner nucleus, an intermediate layer around the nucleus, and an outer layer intercalated with the nucleus or encapsulating the nucleus and the intermediate layer.

20. The lubricated surface of claim 19, wherein the nano-particle inner nucleus comprises at least one of molybdenum disulfide, tungsten disulfide, graphite, or boron nitride; and wherein the intermediate layer and the outer layer independently comprise at least one of a lecithin, phospholipid, phosphide, detergent, glyceride, monoglyceride, diglyceride, thiol phosphate, ester of monoglyceride, ester of fatty acid, compound containing phosphorous, compound containing sulfur, compound containing nitrogen, oil, grease, alcohol, composite oil, canola oil, vegetable oil, soybean oil, corn oil, ester of rapeseed oil, hydrocarbon oil, alkane, or combinations of any thereof.

21. The lubricated surface of claim 1, wherein the nano-particles comprise a plurality of nanoparticle inner nuclei and an outer layer intercalated with each nucleus or encapsulating each nucleus, the layer with the nucleus forming a layered nanoparticle, and a plurality of bonds, each bond bonded to at least two of the layered nanoparticles, such that each layered nanoparticle is bonded to at least one other of the layered nanoparticles by a bond.

22. The lubricated surface of claim 1, wherein the textured features comprise at least one feature selected from the group consisting of pores, waves, striations, channels, protrusions, asperities, depressions, grooves, holes, low points, high points, cracks, low areas, high areas, exposed sandwiched layers, and chemically functional material.

23. The lubricated surface of claim 1, wherein the textured features comprise at least one feature formed by one or more processes selected from the group consisting of etching, chemical etching, chemical functionalization, laser etching, laser blasting, sand blasting, physical etching, mechanical etching, top down processes, bottom up processes, chemical texturing, physical texturing, mechanical texturing, stamping, laser texturing, vapor deposition, plasma deposition, electroplating, self assembly, directed assembly, subtractive manufacturing, additive manufacturing, hybrid manufacturing, and other deposition.

24. The lubricated surface of claim 1, further comprising a tribo-film in contact with the textured features of the textured surface in a position to lubricate the surface.

25. The lubricated surface of claim 24, wherein the tribo-film comprises at least one of a phosphorus-containing compound and a boron-containing compound.

26. The lubricated surface of claim 24, wherein the tribo-film comprises at least one of a phosphide and a boride.

27. The lubricated surface of claim 24, wherein the tribo-film comprises at least a component of the nano-particle lubricant.

28. The lubricated surface of claim 1, wherein the size of one or more of the textured features is a multiple of the size of a nano-particle in contact with the textured surface.

29. The lubricated surface of claim 1, wherein the surface comprises a substrate with a layer of material deposited over at least a portion of the substrate, and wherein the textured features expose at least a portion of the substrate underneath the deposited layer.

30. The lubricated surface of claim 1, wherein the base material comprises at least one material selected from the group consisting of oil, grease, plastic, gel, wax, silicone, hydrocarbon oil, vegetable oil, corn oil, peanut oil, canola oil, soybean oil, mineral oil, paraffin oil, synthetic oil, petroleum gel, petroleum grease, hydrocarbon gel, hydrocarbon grease, lithium based grease, fluoroether based grease, ethylenebistearamide, and combinations of any thereof.

31. The lubricated surface of claim 1, wherein the base material comprises at least one material selected from the group consisting of an oil, a grease, a plastic, a gel, a wax, a silicone, and combinations of any thereof.

32. The lubricated surface of claim 1, wherein the base material comprises an oil or a grease.

33. The lubricated surface of claim 1, wherein the base material comprises at least one material selected from the group consisting of mineral oil, paraffin oil, synthetic oil, petroleum grease, hydrocarbon grease, lithium based grease, and combinations of any thereof.

34. The lubricated surface of claim 1, wherein the nano-particle lubricant further comprises an emulsifier.

35. The lubricated surface of claim 34, wherein the emulsifier comprises at least one material selected from the group consisting of lecithins, phospholipids, soy lecithins, detergents, distilled monoglycerides, monoglycerides, diglycerides, acetic acid esters of monoglycerides, organic acid esters of monoglycerides, sorbitan esters of fatty acids, propylene glycol esters of fatty acids, polyglycerol esters of fatty acids, compounds containing phosphorous, compounds containing sulfur, compounds containing nitrogen, and combinations of any thereof.

36. The lubricated surface of claim 34, wherein the emulsifier comprises a compound containing phosphorous.

37. The lubricated surface of claim 34, wherein the emulsifier comprises a phospholipid.

38. The lubricated surface of claim 34, wherein the emulsifier comprises a lecithin.

39. The lubricated surface of claim 1, wherein the nano-particle lubricant comprises a suspension, dispersion, or emulsion of molybdenum disulfide nano-particles in a base material comprising an oil or a grease, wherein the molybdenum disulfide nano-particles are intercalated with an oil medium selected from the group consisting of composite oil, canola oil, vegetable oil, soybean oil, corn oil, hydrocarbon oil, and combinations of any thereof.

40. The lubricated surface of claim 39, wherein the molybdenum disulfide nanoparticles are intercalated with a vegetable oil.

41. The lubricated surface of claim 39, further comprising an emulsifier comprising a phospholipid.

42. The lubricated surface of claim 41, wherein the emulsifier comprises a lecithin.

43. A method for lubricating a surface comprising:
forming textured features in the surface to enhance the effectiveness of a nano-particle lubricant; and
placing a nano-particle lubricant in contact with the textured features of the textured surface in a position to lubricate the surface, wherein the nano-particle lubricant comprises a suspension, dispersion, or emulsion of nano-particles in a base material.

44. The method of claim 43, wherein forming the textured features to enhance the effectiveness of a nano-particle lubricant comprises chemical texturing.

45. The method of claim 44, wherein chemical texturing comprises chemically functionalizing at least a portion of the lubricated surface.

46. The method of claim 44, wherein chemical texturing comprises chemically anchoring at least a portion of the nano-particle lubricant to the surface.

47. The method of claim 43, wherein the nano-particles have an average particle dimension of less than or equal to about 100 nm.

48. The method of claim 43, wherein the nano-particles comprise solid nano-particles.

49. The method of claim 48, wherein the solid nano-particles comprise at least one material selected from the group consisting of molybdenum disulphide, tungsten disulphide, graphite, intercalated graphite, polytetrafluoroethylene, boron nitride, hexagonal boron nitride, soft metals, silver, lead, nickel, copper, cerium fluoride, zinc oxide, silver sulfate, cadmium iodide, lead iodide, barium fluoride, tin sulfide, zinc phosphate, zinc sulfide, mica, boron nitrate, borax, fluorinated carbon, zinc phosphide, boron, and combinations of any thereof.

50. The method of claim 43, wherein the nano-particles comprise layered nano-particles.

51. The method of claim 43, wherein the nano-particles comprise at least one type of layered nano-particles selected from the group consisting of molybdenum disulfide nano-particles, tungsten disulfide nano-particles, graphite nano-particles, boron nitride nano-particles, and combinations of any thereof.

52. The method of claim 43, wherein the nano-particles comprise at least one layered material comprising a chalcogenide.

53. The method of claim 43, wherein nano-particles comprise molybdenum disulfide nano-particles.

54. The method of claim 43, wherein the nano-particles comprise nano-particles having an open architecture.

55. The method of claim 43, wherein the nano-particles comprise an organic medium intercalated in the nano-particles.

56. The method of claim 55, wherein the organic medium comprises at least one material selected from the group consisting of oil mediums, grease mediums, alcohol mediums, composite oil, canola oil, vegetable oil, soybean oil, corn oil, ethyl and methyl esters of rapeseed oil, distilled monoglycerides, monoglycerides, diglycerides, acetic acid esters of monoglycerides, organic acid esters of monoglycerides, sorbitan, sorbitan esters of fatty acids, propylene glycol esters of fatty acids, polyglycerol esters of fatty acids, hydrocarbon oils, n-hexadecane, phospholipids, and combinations of any thereof.

57. The method of claim 55, wherein the organic medium comprises an oil medium selected from the group consisting of composite oil, canola oil, vegetable oil, soybean oil, corn oil, hydrocarbon oil, and combinations of any thereof.

58. The method of claim 55, wherein the organic medium comprises a vegetable oil.

59. The method of claim 55, wherein the organic medium comprises a phospholipid.

60. The method of claim 43, wherein the nano-particles comprise nano-particles having an open architecture and an organic medium intercalated in the nano-particles.

61. The method of claim 43, wherein the nano-particles are intercalated and encapsulated with an organic medium.

62. The method of claim 43, wherein the nano-particles comprise a layered nano-particle macro-composition.

63. The method of claim 43, wherein the nano-particles comprise a bonded plurality of layered nano-particle macro-compositions.

64. The method of claim 43, wherein the nano-particles comprise a nano-particle inner nucleus, an intermediate layer around the nucleus, and an outer layer intercalated with the nucleus or encapsulating the nucleus and the intermediate layer.

65. The method of claim 64, wherein the nanoparticle inner nucleus comprises at least one of molybdenum disulfide, tungsten disulfide, graphite, or boron nitride; and wherein the intermediate layer and the outer layer independently comprise at least one of a lecithin, phospholipid, phosphide, detergent, glyceride, monoglyceride, diglyceride, thiol phosphate, ester of monoglyceride, ester of fatty acid, compound containing phosphorous, compound containing sulfur, compound containing nitrogen, oil, grease, alcohol, composite oil, canola oil, vegetable oil, soybean oil, corn oil, ester of rapeseed oil, hydrocarbon oil, alkane, or combinations of any thereof.

66. The method of claim 43, wherein the nano-particles comprise a plurality of nanoparticle inner nuclei and an outer layer intercalated with each nucleus or encapsulating each nucleus, the layer with the nucleus forming a layered nano-particle, and a plurality of bonds, each bond bonded to at least two of the layered nanoparticles, such that each layered nano-particle is bonded to at least one other of the layered nano-particles by a bond.

67. The method of claim 43, wherein the textured features comprise at least one feature selected from the group consisting of pores, waves, striations, channels, protrusions, asperities, depressions, grooves, holes, low points, high points, cracks, low areas, high areas, exposed sandwiched layers, and chemically functional material.

68. The method of claim 43, wherein the textured features are formed by one or more processes selected from the group consisting of etching, chemical etching, chemical functionalization, laser etching, laser blasting, sand blasting, physical etching, mechanical etching, top down processes, bottom up processes, chemical texturing, physical texturing, mechanical texturing, stamping, laser texturing, vapor deposition, plasma deposition, electroplating, self assembly, directed assembly, subtractive manufacturing, additive manufacturing, hybrid manufacturing, and other deposition.

69. The method of claim 43, further comprising forming a tribo-film in contact with the textured features of the textured surface in a position to lubricate the surface.

70. The method of claim 69, wherein the tribo-film comprises at least one of a phosphorus-containing compound and a boron-containing compound.

71. The method of claim 69, wherein the tribo-film comprises at least one of a phosphide and a boride.

72. The method of claim 69, wherein the tribo-film comprises at least a component of the nano-particle lubricant.

73. The method of claim 43, wherein the size of one or more of the textured features is a multiple of the size of a nano-particle in contact with the textured surface.

74. The method of claim 43, further comprising:
depositing a layer of material over a substrate surface; and
exposing at least a portion of the substrate by forming the textured features in the deposited layer of material.

75. The method of claim 43, wherein the base material comprises at least one material selected from the group consisting of oil, grease, plastic, gel, wax, silicone, hydrocarbon oil, vegetable oil, corn oil, peanut oil, canola oil, soybean oil, mineral oil, paraffin oil, synthetic oil, petroleum gel, petroleum grease, hydrocarbon gel, hydrocarbon grease, lithium based grease, fluoroether based grease, ethylenebisstearamide, and combinations of any thereof.

76. The method of claim 43, wherein the base material comprises at least one material selected from the group consisting of an oil, a grease, a plastic, a gel, a wax, a silicone, and combinations of any thereof.

77. The method of claim 43, wherein the base material comprises an oil or a grease.

78. The method of claim 43, wherein the base material comprises at least one material selected from the group consisting of mineral oil, paraffin oil, synthetic oil, petroleum grease, hydrocarbon grease, lithium based grease, and combinations of any thereof.

79. The method of claim 43, wherein the nano-particle lubricant further comprises an emulsifier.

80. The method of claim 79, wherein the emulsifier comprises at least one material selected from the group consisting of lecithins, phospholipids, soy lecithins, detergents, distilled monoglycerides, monoglycerides, diglycerides, acetic acid esters of monoglycerides, organic acid esters of monoglycerides, sorbitan esters of fatty acids, propylene glycol esters of fatty acids, polyglycerol esters of fatty acids, compounds containing phosphorous, compounds containing sulfur, compounds containing nitrogen, and combinations of any thereof.

81. The method of claim 79, wherein the emulsifier comprises a compound containing phosphorous.

82. The method of claim 79, wherein the emulsifier comprises a phospholipid.

83. The method of claim 79, wherein the emulsifier comprises a lecithin.

84. The method of claim 43, wherein the nano-particle lubricant comprises a suspension, dispersion, or emulsion of molybdenum disulfide nano-particles in a base material comprising an oil or a grease, wherein the molybdenum disulfide nano-particles are intercalated with an oil medium selected from the group consisting of composite oil, canola oil, vegetable oil, soybean oil, corn oil, hydrocarbon oil, and combinations of any thereof.

85. The method of claim 84, wherein the molybdenum disulfide nanoparticles are intercalated with a vegetable oil.

86. The method of claim 84, wherein the nano-particle lubricant further comprises an emulsifier comprising a phospholipid.

87. The method of claim 86, wherein the emulsifier comprises a lecithin.

88. The lubricated surface of claim 1, wherein the nano-particles comprise inorganic nano-particles.

89. The method of claim 43, wherein the nano-particles comprise inorganic nano-particles.

90. The lubricated surface of claim 1, wherein the nano-particles comprise nano-particles selected from the group consisting of molybdenum disulfide nano-particles, tungsten disulfide nano-particles, graphite nano-particles, boron nitride nano-particles, silver nano-particles, lead nano-particles, nickel nano-particles, copper nano-particles, cerium fluoride nano-particles, zinc oxide nano-particles, silver sulfate nano-particles, cadmium iodide nano-particles, lead iodide nano-particles, barium fluoride nano-particles, tin sulfide nano-particles, zinc phosphate nano-particles, zinc sulfide nano-particles, mica nano-particles, boron nitrate nano-particles, borax nano-particles, fluorinated carbon nano-particles, zinc phosphide nano-particles, boron nano-particles, and combinations thereof.

91. The method of claim 43, wherein the nano-particles comprise nano-particles selected from the group consisting of molybdenum disulfide nano-particles, tungsten disulfide nano-particles, graphite nano-particles, boron nitride nano-particles, silver nano-particles, lead nano-particles, nickel nano-particles, copper nano-particles, cerium fluoride nano-particles, zinc oxide nano-particles, silver sulfate nano-particles, cadmium iodide nano-particles, lead iodide nano-particles, barium fluoride nano-particles, tin sulfide nano-particles, zinc phosphate nano-particles, zinc sulfide nano-particles, mica nano-particles, boron nitrate nano-particles, borax nano-particles, fluorinated carbon nano-particles, zinc phosphide nano-particles, boron nano-particles, and combinations thereof.

92. The lubricated surface of claim 1, wherein the nano-particles comprise nano-particles selected from the group consisting of graphene nanoparticles, diamond nanoparticles, diamond-like nanoparticles, carbon nanotubes, carbon fullerenes, and combinations thereof.

93. The method of claim 43, wherein the nano-particles comprise nano-particles selected from the group consisting of graphene nanoparticles, diamond nanoparticles, diamond-like nanoparticles, carbon nanotubes, carbon fullerenes, and combinations thereof.

* * * * *